United States Patent
Kau et al.

(10) Patent No.: US 9,344,518 B2
(45) Date of Patent: May 17, 2016

(54) FACILITATION OF SOCIAL INTERACTIONS

(71) Applicant: GLOBALFOUNDRIES INC., Grand Cayman (KY)

(72) Inventors: Christian B. Kau, Los Altos, CA (US); Anuj Kumar, Pittsburgh, PA (US); Barton A. Smith, Campbell, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 31 days.

(21) Appl. No.: 13/891,700

(22) Filed: May 10, 2013

(65) Prior Publication Data

US 2014/0338002 A1 Nov. 13, 2014

(51) Int. Cl.
| | |
|---|---|
| G06F 21/00 | (2013.01) |
| H04L 29/08 | (2006.01) |
| G06F 17/30 | (2006.01) |
| G06F 21/62 | (2013.01) |
| G06Q 30/02 | (2012.01) |
| G06Q 50/00 | (2012.01) |

(52) U.S. Cl.
CPC ........ *H04L 67/306* (2013.01); *G06F 17/30424* (2013.01); *G06F 21/62* (2013.01); *G06Q 30/02* (2013.01); *G06Q 50/01* (2013.01)

(58) Field of Classification Search
CPC .. H04L 67/306; G06F 17/30424; G06F 21/62
USPC ................ 726/26–28; 707/999.003, 999.009
See application file for complete search history.

(56) References Cited

U.S. PATENT DOCUMENTS

| | | | |
|---|---|---|---|
| 5,649,182 A * | 7/1997 | Reitz | |
| 7,593,740 B2 | 9/2009 | Crowley et al. | |
| 8,204,513 B2 | 6/2012 | Crowley et al. | |
| 8,930,392 B1 | 1/2015 | Leichter | |
| 2002/0087529 A1 | 7/2002 | Dutcher et al. | |
| 2004/0030691 A1 | 2/2004 | Woo | |
| 2006/0085419 A1* | 4/2006 | Rosen | 707/9 |
| 2006/0161599 A1 | 7/2006 | Rosen | |
| 2007/0282621 A1 | 12/2007 | Altman et al. | |
| 2008/0032673 A1 | 2/2008 | Osborn et al. | |
| 2008/0040474 A1 | 2/2008 | Zuckerberg et al. | |
| 2008/0051033 A1* | 2/2008 | Hymes | 455/47 |
| 2008/0270908 A1 | 10/2008 | Hope | |
| 2009/0181653 A1 | 7/2009 | Alharayeri | |
| 2009/0276355 A1 | 11/2009 | Willmore et al. | |
| 2010/0082434 A1 | 4/2010 | Chen et al. | |

(Continued)

OTHER PUBLICATIONS

Bo Li et al., Building social Network by Electronic Cigarette, 2011 iEEE International Conferences on Internet of Things, and Cyber, Physical and Social Computing; Bo Li et al., pp. 1-3.

(Continued)

*Primary Examiner* — John B King
(74) *Attorney, Agent, or Firm* — Anthony Canale; Hoffman Warnick LLC

(57) ABSTRACT

Embodiments relate to facilitating social interactions. An aspect includes determining that a first communications device is in communicative contact with a second communications device, identifying at least one artifact relating to a user of the first communications device, and searching at least one database for information about a user of the second communications device that is in common with the user of the first communications device with respect to the artifact. Also, results of the searching are provided as a topic of conversation to the first communications device.

8 Claims, 5 Drawing Sheets

(56) References Cited

U.S. PATENT DOCUMENTS

| | | | |
|---|---|---|---|
| 2010/0257239 A1* | 10/2010 | Roberts | 709/204 |
| 2010/0260073 A1 | 10/2010 | Jager et al. | |
| 2011/0178881 A1 | 7/2011 | Pulletikurty | |
| 2011/0320536 A1 | 12/2011 | Lobb et al. | |
| 2012/0058455 A1 | 3/2012 | Lawrence et al. | |
| 2012/0123779 A1 | 5/2012 | Pratt et al. | |
| 2012/0166350 A1 | 6/2012 | Piccionelli et al. | |
| 2012/0259791 A1 | 10/2012 | Zoidze | |
| 2012/0323909 A1 | 12/2012 | Behforooz et al. | |
| 2013/0007634 A1 | 1/2013 | Galvin et al. | |
| 2013/0073473 A1* | 3/2013 | Heath | 705/319 |
| 2013/0159883 A1 | 6/2013 | Yerli | |
| 2013/0185368 A1 | 7/2013 | Nordstrom et al. | |
| 2014/0019533 A1 | 1/2014 | Sherman et al. | |
| 2014/0156681 A1* | 6/2014 | Lee et al. | 707/754 |
| 2014/0244335 A1 | 8/2014 | Baldwin et al. | |
| 2014/0244531 A1 | 8/2014 | Baldwin et al. | |
| 2014/0244612 A1 | 8/2014 | Bhasin et al. | |

OTHER PUBLICATIONS

IP.com; Method for Enabling an Icebreaker in an E-mail Message; Pub, Mar. 6, 2009, pp. 1-3.

U.S. Appl. No. 13/965,684; Non-Final Office Action; Date Filed: Aug. 13, 2013; Date Mailed: Feb. 13, 2015; 18 pages.

U.S. Appl. No. 13/965,684; Final Office Action; Date Filed: Aug. 13, 2013; Date Mailed: Jul. 22, 2015; 24 pages.

\* cited by examiner

300

Personal Information ——— 302
   Name
   Address
   Phone Number
   Cell Number
   Email

. . .

Business ——— 304
   Employer
   Dates of Employment
   Occupation
   Location of Employment

. . .

Interests ——— 306
   Music
   Travel
     Europe
     South America
   Books
     Historical Fiction
     Civil War
   Social Media Friends

. . .

Miscellaneous ——— 308
   Frequent Flyer

Your Conversation Starter with <Name>

1. Employed at XYZ Corp.

2. Previously Resided in Southern California

3. Fan of Soccer

4. Rare Coins Collector

5. Triathlon Participant

FIG. 4

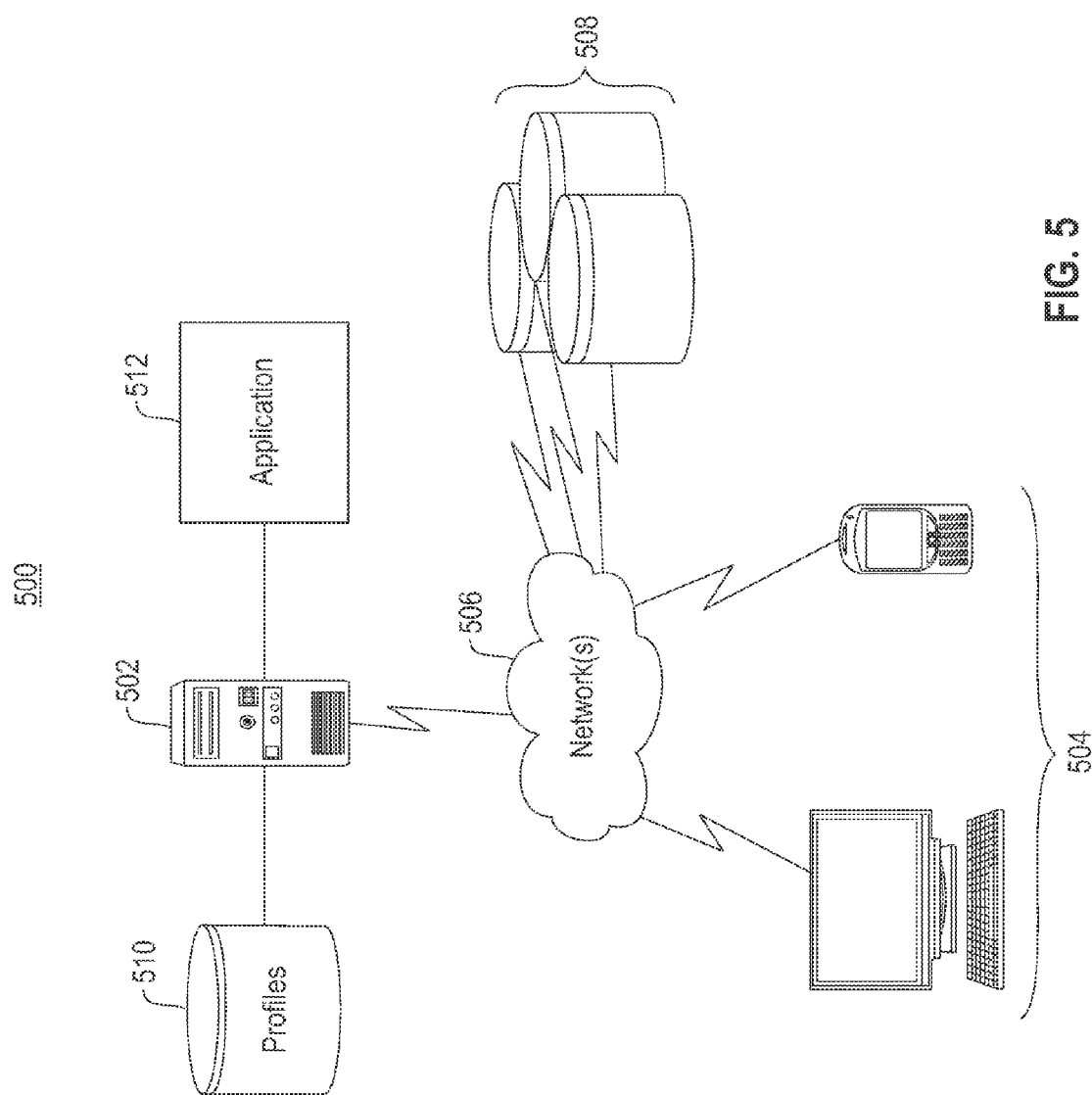

FACILITATION OF SOCIAL INTERACTIONS

BACKGROUND

The present disclosure relates generally to electronic communications, and more specifically, to facilitating social interactions between users of communications devices.

Meeting new people is a challenging yet important aspect of everyday life. This challenge stems from a number of factors, such as the pressure of establishing a good first impression, inherent shyness in approaching strangers, or simply lacking topics of discussion.

To make any introduction interesting and memorable, people generally attempt to find common topics such as mutual friends, professional interests, affiliations, educational backgrounds, etc., by using conventional conversation starters, such as "What do you do for a living?" Personal topics are generally avoided, for example, in situations such as when two people are at the introduction stage of a business or social relationship or are recently acquainted. With such limitations, however, it is oftentimes difficult for people to find common topics of conversation.

BRIEF SUMMARY

A system for facilitating social interactions includes a memory having computer readable computer instructions and a processor for executing the computer readable instructions to perform a method. The method includes determining that a first communications device is in communicative contact with a second communications device, identifying at least one artifact relating to a user of the first communications device, and searching at least one database for information about a user of the second communications device that is in common with the user of the first communications device with respect to the artifact. The method also includes providing results of the searching, as a topic of conversation, to the first communications device.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 3 depicts a database structure with sample data for use by the social interaction facilitation tool in accordance with an embodiment;

FIG. 4 depicts a user interface screen of a communications device with sample results of implementing the social interaction facilitation tool in accordance with an embodiment; and FIG. 5 depicts a system upon which social interaction facilitation processes may be implemented in accordance with an embodiment.

DETAILED DESCRIPTION

Finding a common topic between two individuals using contemporary methods of conversation starters does not guarantee that a satisfactory topic of interest will be discovered. In addition, contemporary methods can limit the domain of commonalities between the individuals (e.g., where social protocols discourage topics that are personal in nature), which can lead to initial boredom and/or a negative first impression. Thus, in using such an open discovery strategy for finding commonalities, discussions are oftentimes restricted to domains with a limited set of options, e.g., affiliations or education, and not to those with a lengthy list of options, e.g., friends, skills, hobbies, etc.

The embodiments described herein provide a social interaction facilitation tool that automates the process of identifying commonalities between two individuals to facilitate serendipitous social introductions and communication exchanges. In particular, the embodiments provide recommended topics of conversation to individuals in advance of their meeting or once the individuals have met (e.g., they have a pre-existing, but limited relationship and knowledge of one another). In a further embodiment, the social interaction facilitation tool provides recommended topics of conversation to individuals upon determining that the individuals are in communicative contact through respective communications devices.

Figure 1:
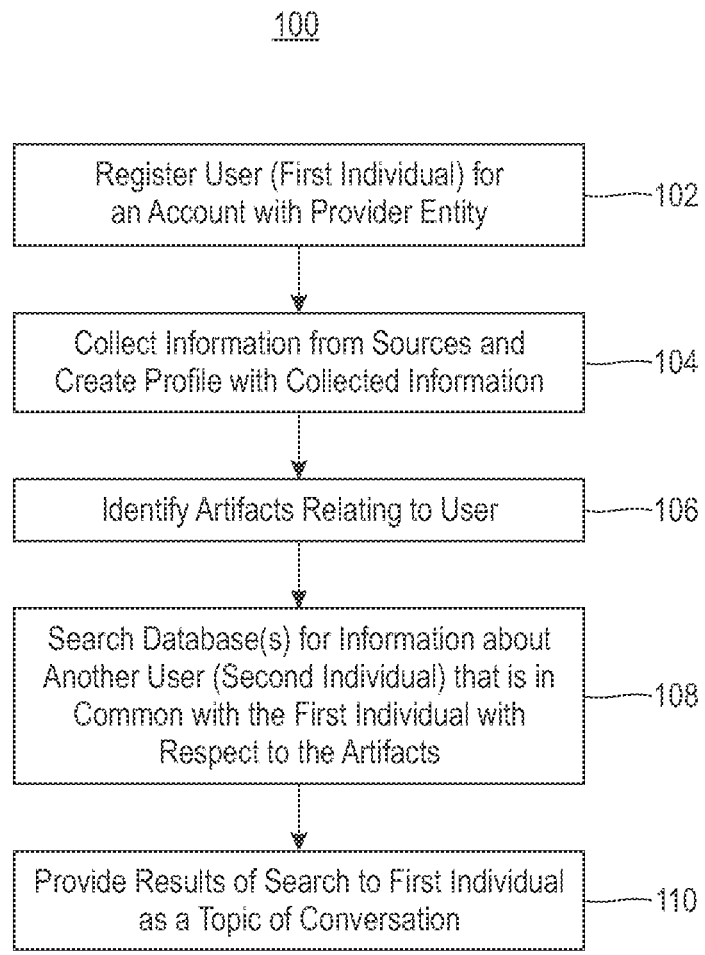
FIG. 1 depicts a flow diagram of a process for implementing a social interaction facilitation tool in accordance with an embodiment.
Figure 2:
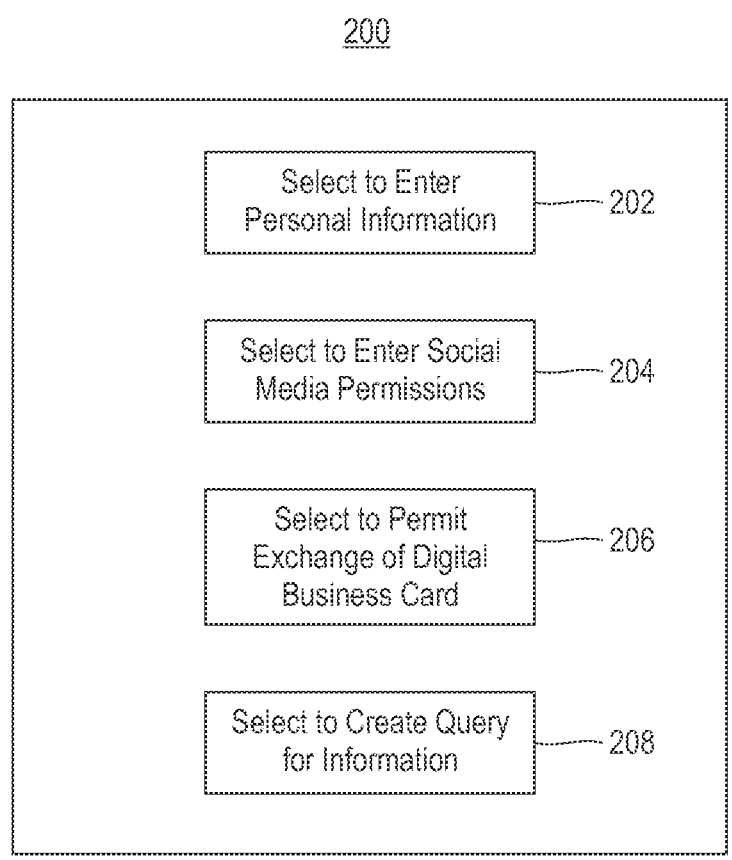
FIG. 2 depicts a user interface screen of a communications device through which a set up process for the social interaction facilitation tool may be implemented in accordance with an embodiment.

Turning now to FIG. 1, a flow diagram of a process 100 in accordance with an embodiment is generally shown. At block 102, the process 100 registers a user to establish an account with a provider of the social interaction facilitation tool. For example, as shown in FIG. 2, a user interface screen 200 may be displayed on a communications device operated by the user who then registers by providing personal information (e.g., name and contact information) through an option 202, which personal information is then transmitted from the communications device to the provider. In addition to the personal information, if the user so desires, authorization may be granted by the user to the provider for enabling the provider to access social media accounts of the user (e.g., through an option 204), which may otherwise be access-restricted. With this permission, the provider may gather information about the user from these social media accounts, as will be described further herein. It will be appreciated that if the user has not secured his/her social media account, i.e., it is accessible to the public, the provider may freely access information from the social media account absent authorization from the user. Additionally, other information sources containing publicly available information about the user may be accessed by the social interaction facilitation tool.

At block 104, the social interaction facilitation tool collects information about the user from various sources as indicated above and creates a profile in which this information is organized and stored. Collectively, this information is referred to herein as "artifacts." A profile 300 with sample data created by the social interaction facilitation tool via a data structure is shown in FIG. 3. As shown in FIG. 3, the profile 300 includes personal information 302, which may be derived in part from the personal information provided by the user via the user interface option 202 illustrated in FIG. 2. In addition, the profile 300 includes information collected from social media websites (either publicly available or with granted permissions), and sources of other publicly available online information (e.g., an employer website associated with the user). This information may be represented as categories, which are illustrated by way of example in the profile 300 as business 304, interests 306, and miscellaneous 308. The social interaction facilitation tool may continuously search these sources of information and update the profile 300 accordingly. This searching and updating may be performed absent intervention and/or knowledge of the user.

In one embodiment, the user of the communications device (also referred to as a "first communications device") seeks information about an individual in preparation of meeting the individual. For example, the user of the first communications device may be a salesperson who seeks a conversation topic in preparation of a meeting with a potential client. In another embodiment, the first communications device may be currently in communicative contact with the individual via a second communications device. In this embodiment, the users of the communications devices may be engaged through a social media website (e.g., a status identifying the users as currently online, or a communication conducted between the users through a message post or thread, email account, or instant messaging account), an email system, instant messaging system, or other means of contact.

At block 106, the process 100 identifies artifacts relating to the user of the first communications device. The artifacts may be any type of information collected about the user, as described above, and the information may be derived from any number and types of information sources, such as from the user directly (e.g., through the personal information option 202) and from electronic data sources, such as social media websites in which permissions have been granted (e.g., via the permissions option 204) and/or publicly available online information. It will be understood that multiple artifacts may be collected regarding the user. Collectively, these artifacts are stored in the profile 300 managed by the social interaction facilitation tool, as shown in FIG. 3.

At block 108, the process 100 includes searching one or more databases for information about the individual (who is the subject of the user's interest) that is in common with, or related to the user of the first communications device with respect to the artifacts. For example, if one of the artifacts is the name of a hobby enjoyed by the user of the first communications device, the process 100 includes searching various databases, which store information about the individual, for the hobby name, as well as any synonyms or derivatives of the hobby.

The search described in block 108 may be initiated automatically or based on some event. In one embodiment, the process 100 may search databases in response to a request (i.e., the event) from the user of the first communications device. An option 208 in the user interface screen 200 of FIG. 2 may be selected by the user for this purpose. Once selected, the social interaction facilitation tool receives the request for the information and initiates the search.

In another embodiment, the process 100 may automatically search databases for information about the individual in response to determining that the first communications device is in communicative contact with the second communications device operated by the individual (i.e., absent any request for the information from either party). In this embodiment, the determination may be implemented in a variety of ways. For example, if the social interaction facilitation tool is configured to operate within a social media network setting, the social interaction facilitation tool may determine the communicative contact from a status set by the network indicating both users are simultaneously online and are in some manner linked together (e.g., through a friend list), or by identifying a post or message communicated between the users through the social media network. By contrast, if the determination is based on an event, the determination may be made in response to a query received from the user via the social interaction facilitation tool that includes identification information of the individual in response to the user determining the individual, via the second communications device, is active or online.

In yet another embodiment, where the two communications devices are mobile devices (e.g., cellular telephones, smart phones, personal digital assistants, tablets, etc.), the communicative contact determination may be inferred from geographic coordinates received by the social interaction facilitation tool for the two communications devices, which may be configured with global positioning system (GPS) components. Alternatively, identifying information may be wirelessly exchanged between the first and second communications devices, and the first communications device may then transmit the identifying information it received from the second communications device to the provider. For example, if the first and second communications devices are configured with electronic business cards stored in their memory, this information can be wirelessly exchanged, e.g., using short-range wireless communication protocols, such as Bluetooth®, or through radio frequency identification (RFID) components installed on the first and second communications devices, such as cameras, card readers, and quick response (QR) codes. The exchange may be implemented through an option 206 on the user interface screen 200 of FIG. 2.

Turning back to FIG. 1, a result of the search that reflects a match for the artifact that relates to the user of the second communications device indicates a potential common area of interest between the two users, and consequently, a topic of conversation. At block 110, the process includes providing results of the searching to the first communications device as one or more topics of conversation. A user interface 400 including sample results of a search (i.e., topics of conversation) is presented in FIG. 4. In one embodiment, the resulting topics of conversation may be weighted and prioritized, such that the top results are presented in order of relevance. The weighting may be implemented using various techniques, such as applying a weight as a function of the frequency of occurrence of topic-related terms in the search results.

In one embodiment, an algorithm to determine an importance of profile features may be applied in which a set of profile features is $f_1, f_2, \ldots, f_m$, such as education, affiliation, interest, skill, etc. An objective of the algorithm is to determine the importance of variables $a_1, a_2, a_3, \ldots, a_m$, each of which correspond with the profile features above. Then, let $u_i = \{u_{i1}, u_{i2}, \ldots, u_{im}\}$ denote the profile vector of a user, with $u_{i1}, u_{i2}, \ldots, u_{im}$ representing the values for the features $f_1, f_2, \ldots, f_m$ for user Further, let $i_i = \{i_{i1}, i_{i2}, \ldots, i_{im}\}$ denote the interactions that $u_i$ has had on all social networks, such as Facebook® or LinkedIn® posts, photo tags, etc. So, for each interaction $i_{ik}$, where k ranges from 1 to n, user $u_i$ has interacted with another user $u_j$. Note that $u_j$ represents individual j with whom individual i has interacted. Then, $u_j$ changes for each $i_{ik}$, i.e., each interaction of the individual i is with a different user. So, for each feature $f_x$, where x ranges from 1 to m, for user $u_i$, $a_x$ may be computed as:

$$a_x = \Sigma_{x-1}{}^m \text{if}(u_{ix} == u_{jx}), \text{ then } 1, \text{ else } 0$$

Each feature is then ranked based on the importance factor associated with it to determine the importance of the feature. In order to minimize search time, the social interaction facilitation tool may stop searching for commonalities once a maximum number of commonalities required by the user are reached.

In an embodiment, the social interaction facilitation tool may be configured to return one or more topics of conversation in cases where no commonalities are found (e.g., where the user profile data from a searched source of information is insufficient). The social interaction facilitation tool may build a 'shared taste' model using interaction data (e.g., opinions from wall posts or activities (image captions) for both device users. A Latent Dirichlet Allocation (LDA) algorithm, for example, may be used to build this model, where the input includes a list of documents representing wall posts or image captions), and the output is a set of topics that these activities and opinions represent. The algorithm may also take into account the recency of the wall post or the image to prioritize the topics that are most relevant to both users at that particular point in time. Using the output from this model, the social interaction facilitation tool may query the web for relevant and interesting conversation topics, such as top news articles. These top news articles may be filtered based on the cosine similarity of the news article to the interaction data. Moreover, location information may be utilized to locate any nearby activities or places that might seem interesting, e.g., a match in the shared tastes of both users.

Turning now to FIG. 5, a system 500 upon which social interaction facilitation processes may be implemented in an embodiment will now be described.

The system 500 includes a host system computer 502 and communications devices 504 communicatively coupled to one or more network(s) 506. The host system computer 502 may be implemented as one or more high-speed computer processing devices, such as one or more mainframe computers or servers capable of handling a high volume of computing activities conducted by end users of the social interaction facilitation tool. The host system computer 502 may operate as a database server and coordinate access to application data including data stored on a storage device 510. The storage device 510 may be implemented using memory contained in the host system computer 502 or may be a separate physical device. In an embodiment, the storage device 510 stores user profiles, such as the profile 300 of FIG. 3.

The host system computer 502 may be implemented using one or more servers operating in response to a computer program stored in a storage medium accessible by the server. The host system computer 502 may also operate as a network server (e.g., a web server) to communicate with the communications devices 504, as well as any other network entities. In an embodiment, the host system computer 502 may represent a node in a cloud computing environment or may be configured to operate in a client/server architecture.

The communications devices 504 may be any type of devices with computer processing capabilities. For example, the communications devices 504 may include a combination of general-purpose computers (e.g., desktop, lap top), host-attached terminals (e.g., thin clients), and portable communication devices (e.g., smart phones, personal digital assistants, and tablet PCs). The communications devices 504 may be wired or wireless devices. In an embodiment, the communications devices 504 may represent cloud consumers in a cloud computing environment.

In an embodiment, the communications devices 504 may be implemented by end users of a website or web service hosted by an entity or enterprise operating the host system computer 502. The communications devices 504 may each execute a web browser for accessing network entities, such as the host system computer 502. In an embodiment, the communications devices 504 access a web site of the host system computer 502 for browsing and accessing an application 512. The application 512 implements the social interaction facilitation tool described herein.

The network(s) 506 may be any type of known networks including, but not limited to, a wide area network (WAN), a local area network (LAN), a global network (e.g. Internet), a virtual private network (VPN), and an intranet. The network(s) 506 may be implemented using a wireless network or any kind of physical network implementation known in the art, e.g., using cellular, satellite, and/or terrestrial network technologies.

The system 500 also includes storage devices 508 communicatively coupled to the host system computer 502. The storage devices 508 may be logically addressable as consolidated data sources across a distributed environment that includes a network (e.g., network(s) 506). In an embodiment, the storage devices 508, as well as the storage device 510, represent the data sources searched by the social interaction facilitation tool in creating the user profile, as well as for determining commonalities between users used to create a topic of conversation.

Technical effects and benefits include providing a social interaction facilitation tool that automates the process of identifying commonalities between two individuals to facilitate serendipitous social introductions. The social interaction facilitation tool gathers information about the individuals from various electronic data sources, such as social media websites, and determines common subjects or topics of conversation, which are then transmitted to communications devices of the individuals for establishing or facilitating conversations on topics of interest to each of the individuals. By virtue of connecting to electronic sources such as social media sites, the embodiments factor in comprehensive and up-to-date user data. The embodiments further embed a function to recommend commonalities even in cases where little or no personal information about a user is known, and make recommendations only when two users voluntarily meet, thereby avoiding issues surrounding user privacy and battery drainage.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A system, comprising:
   a mobile communications device having a memory storing computer readable computer instructions, the memory storing a user profile of a user of the mobile communications device;
   a processor for executing the computer readable instructions and:
   a short-range wireless transceiver coupled to the mobile communications device;
   wherein the processor executes the computer readable instructions to perform a method, comprising:
   generating the profile, comprising:
     identifying artifacts from interactions of the user, via the mobile communications device, with electronic data sources and users of other communications devices over a network; and ranking the artifacts by importance as defined by frequency of interactions between the mobile communications device and the electronic data sources;

determining, via the short-range wireless transceiver over a wirless network, that another communications device is in communicative contact with the mobile communications device, the determining comprising receiving a communication from the other communications device that includes an identification of a user of the other communications device;

selecting, from the profile in the memory, at least one of the artifacts relating to the user of the mobile communications device;

searching, over a network using the identifier of the user of the other communications device, at least one database for information about the user of the other communications device that is in common with the user of the mobile communications device with respect to the artifact;

prioritizing results of the searching based on a recency of occurrence of each of the results in the database; and providing a prioritized listing of the results of the searching, as topics of conversation, to the mobile communications device.

2. The system of claim 1, wherein the identifying artifacts from interactions of the user, via the mobile communications device, identifying artifacts from interactions of the user, the identifying initiated absent input from the user of the mobile communications device.

3. The system of claim 1, wherein the identifying artifacts includes searching an access-restricted electronic data source for information about the user of the mobile communications device, the method further comprising:

receiving authorization from the user of the mobile communications device to search the access-restricted electronic data source;

creating the profile for the user of the mobile communications device; and storing retrieved information from the access-restricted electronic data source, including the artifacts, in the profile.

4. The system of claim 3, wherein the method further comprises:

periodically searching the access-restricted electronic data source for new and changed information about the user of the mobile communications device; and updating the profile with results of the periodic searching.

5. The system of claim 3, wherein the access-restricted electronic data source comprises a social media network account of the user of the mobile communications device.

6. The system of claim 5, wherein the artifacts contain topics that are extracted from documents of the social media network account and represent at least one of wall posts and image captions, and wherein the searching at least one database further includes searching for news articles associated with the extracted topics.

7. The system of claim 1, wherein the identification of the other communications device includes an electronic business card of the user of the other communications device.

8. The system of claim 1, wherein searching the at least one database for information about a user of the other communications device includes searching a social media account of the user and extracting artifacts from content of the social media account of the second user.

* * * * *